US012746934B2

(12) United States Patent
Aggarwal

(10) Patent No.: US 12,746,934 B2
(45) Date of Patent: Sep. 29, 2026

(54) SMART SYSTEM FOR DETERMINING DRIVING BEHAVIOUR OF DRIVER

(71) Applicant: SenSight Technologies Private Limited, Bangalore (IN)

(72) Inventor: Kamal Aggarwal, Bangalore (IN)

( * ) Notice: Subject to any disclaimer, the term of this patent is extended or adjusted under 35 U.S.C. 154(b) by 87 days.

(21) Appl. No.: 18/832,474

(22) PCT Filed: Jan. 23, 2023

(86) PCT No.: PCT/IB2023/050551
§ 371 (c)(1),
(2) Date: Jul. 31, 2024

(87) PCT Pub. No.: WO2023/139555
PCT Pub. Date: Jul. 27, 2023

(65) Prior Publication Data

US 2025/0171029 A1 May 29, 2025

(30) Foreign Application Priority Data

Jan. 24, 2022 (IN) ............................ 202141040988

(51) Int. Cl.
*B60W 40/09* (2012.01)
*B60W 30/18* (2012.01)
(Continued)

(52) U.S. Cl.
CPC ...... *B60W 40/09* (2013.01); *B60W 30/18145* (2013.01); *B60W 30/18163* (2013.01);
(Continued)

(58) Field of Classification Search
CPC ........... B60W 40/09; B60W 30/18145; B60W 50/00; G07C 5/08
See application file for complete search history.

(56) References Cited

U.S. PATENT DOCUMENTS

2004/0236474 A1* 11/2004 Chowdhary ....... G06Q 30/0601 701/1
2013/0166099 A1* 6/2013 Van den Bergh ....... G06F 17/00 701/1

(Continued)

FOREIGN PATENT DOCUMENTS

GB 2573738 A 11/2019
WO 2020115081 A1 6/2020

OTHER PUBLICATIONS

PCT/IB2023/050551, "International Search Report and Written Opinion", International Searching Authority, Mar. 28, 2023, pp. 1-8.

*Primary Examiner* — Tan Q Nguyen

(57) ABSTRACT

A system (1) for efficiently determining a driving behaviour of a driver driving a vehicle. The system includes a 3-axis accelerometer (2) generating accelerometer data (3), a direction sensor (4) generating direction data (5) and orientation sensor (6) generating orientation and angular velocity data (7), all placed inside the vehicle. The system (1) also includes a processing unit (8) which processes the accelerometer data (3), the direction data (5) and the orientation data (7), and calibrates the accelerometer data (3) to generate a calibrated accelerometer data (9). The calibrated accelerometer data (9) is used in determining the driving behaviour of the driver of the vehicle and generate Driving Deficiency Alerts, including but not limited to Over-speeding. Hard acceleration. Sudden Braking, Fast Cornering, Quick Lane Changing, Distracted Driving, Dangerous Driving over bumps and Crash Detection.

15 Claims, 10 Drawing Sheets

(51) Int. Cl.
*B60W 50/00* (2006.01)
*G07C 5/08* (2006.01)

(52) U.S. Cl.
CPC ..... *B60W 50/00* (2013.01); *B60W 2050/0083* (2013.01); *B60W 2420/905* (2013.01); *B60W 2520/105* (2013.01); *B60W 2552/35* (2020.02)

(56) References Cited

U.S. PATENT DOCUMENTS

| | | | | |
|---|---|---|---|---|
| 2013/0302758 | A1* | 11/2013 | Wright ................ | H04M 1/6041<br>701/1 |
| 2022/0041169 | A1* | 2/2022 | Krishna .............. | B60W 40/105 |
| 2023/0264711 | A1* | 8/2023 | Kim .................... | B60W 50/082<br>701/23 |

* cited by examiner

FIF 3-2 (continued)

SMART SYSTEM FOR DETERMINING DRIVING BEHAVIOUR OF DRIVER

FIELD OF THE INVENTION

The present invention relates to driving behavior monitoring system. More particularly the invention relates to driving behavior of a driver driving a vehicle by calibrating, correcting and analyzing the data obtained from the sensors during the drive.

BACKGROUND OF THE INVENTION

In modern days, road safety is becoming an increasing concern for everyone with the rising number of accidents. Driving behavior and road accidents are directly related to each other. Around 1.35 million people get killed in road accidents around the world each year. It is possible to avoid most by following certain safety measures. However, these measures are often overlooked by drivers in today's hectic world. Existing methods of monitoring Driving Behavior of a driver driving a vehicle involve use of standalone Telematics Data processing system, driving policy, training etc. to overcome accident risk and safe driving practices.

The methods involve using a telematics device in the Vehicle is expensive and involves additional logistics of fitting the device in the vehicle. Further, the conventional Smartphone based Driving Behavior monitoring solutions are not accurate.

In light of the foregoing discussion, there is a need to develop economic and accurate solution for safe driving practices and reduce accident risk, which offers high accuracy of driving behavior monitoring without the use of any dedicated telematics device in the vehicle. Also, the solution is required which can also be used to rank drivers based on safe driving score and reward them for safe driving, more specifically as a part of Fleet Management System or Usage Based Insurance program to ensure safe driving practices and reduce accident risk.

OBJECT OF THE INVENTION

The object of the invention is to provide a system for determining behavior of a driver driving a vehicle.

Another object of the invention is to provide the system that can determine the driving behavior using the data from mobile communication device in the vehicle such as Driver's Smartphone with a high degree of accuracy and robustness. Optionally, the mobile communication device is communicably paired with low-cost Inertial Measurement Unit (IMU) sensor, to further improve the accuracy of the driving behavior with minimal cost addition and inconvenience to the driver.

Another object of the invention is to provide a system for calibrating the accelerometer data of the vehicle to prepare it for determining the driving behavior of the driver driving the vehicle, wherein the vehicle could be four-wheeler and above vehicles (such as cars, trucks and buses) as well as two-wheeler vehicles (such as motorcycles and bicycles).

A further object of the invention is to provide the system which combines the different rash and unsafe driving behavior to rate the drivers for safe driving.

SUMMARY OF THE INVENTION

A system for efficiently determining a driving behaviour of a driver driving a vehicle is provided. The system comprises a 3-axis accelerometer generating acceleration data, direction sensor generating direction data, orientation sensor generating orientation data. The system's processing unit processes the data through a sequence of processing steps to generate a calibrated accelerometer data where the 3 axes of accelerometer are aligned with the direction of the vehicle. System uses the calibrated accelerometer data along with the direction data to determine various inappropriate driving behaviour instances using a sequence of processing steps. System is adapted to generate Driving Deficiency Alerts, including but not limited to Over-speeding, Hard acceleration, Sudden Braking, Fast Cornering, Quick Lane Changing, Distracted Driving, Dangerous Driving over bumps and Crash Detection. System is adapted to determine driving behaviour for a vehicle that could be four-wheeler and above vehicles (such as cars, trucks and buses) as well as two-wheeler vehicles (such as motorcycles and bicycles) which can rotate laterally. System is adapted to determine the driving behavior using the data from mobile communication device in the vehicle such as Driver's Smartphone. Optionally, the mobile communication device is communicably paired with low-cost Inertial Measurement Unit (IMU) sensor, to further improve the accuracy of the driving behaviour.

BRIEF DESCRIPTION OF DRAWINGS

The novel features and characteristics of the disclosure are set forth in the description. The disclosure itself, however, as well as a preferred mode of use, further objectives and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which:

FIG. 2-1 illustrates another embodiment of a part of the system which relates to generating calibrated acceleration data.

FIG. 2-2 illustrates the sequence of process steps carried out inside the Processing System related to generation of calibrated acceleration data.

FIG. 3-1 illustrates a part of the system determining various inappropriate driving behavior instances.

FIG. 3-2 illustrates the sequence of process steps in the system determining various inappropriate driving behavior instances

The figures depict embodiments of the disclosure for purposes of illustration only. One skilled in the art will readily recognize from the following description that alternative embodiments of the assemblies, structures and methods illustrated herein may be employed without departing from the principles of the disclosure described herein.

DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting. The system, methods, and examples provided herein are only illustrative and not intended to be limiting.

Embodiments of the present invention will be described below in detail with reference to the accompanying figures.

The present disclosure relates to monitoring of driving Behavior of a driver driving a vehicle using data from Driver Smartphone. Optionally, a low-cost Inertial Measurement Unit (IMU), placed in the vehicle which is combined with Driver Smartphone data. The solution also generates composite and normalized Safe Driving score by combining the different driving behavior parameters.

Figure 1:
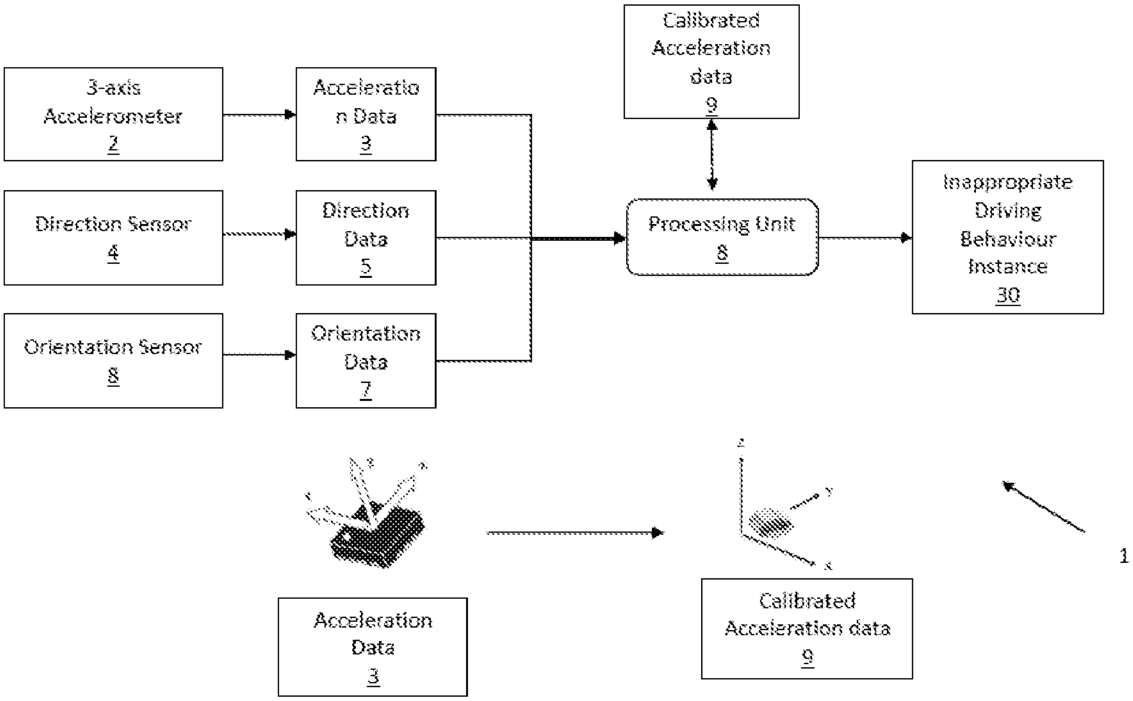
FIG. 1 shows a schematic diagram of a system for calibrating accelerometer data of the vehicle.

FIG. 1 shows a schematic diagram of a system (1) for calibrating accelerometer data of the vehicle and further determining the driving behavior of a driver driving a vehicle. The system (1) includes a 3-axis accelerometer (2), a direction sensor (4) and an orientation sensor (6) which are placed inside the vehicle. The 3-axis accelerometer (2) generates an acceleration data (3) related to the acceleration on the accelerometer at each time instant. The direction sensor (4) generates a direction data (5) related to a direction in which the 3-axis accelerometer (2) is travelling. The orientation sensor (6) generates an orientation data (7) related to an orientation and/or an angular velocity of the 3-axis accelerometer (2).

The system (1) also includes a processing unit (8) which processes the accelerometer data (3), the direction data (5) and the orientation data (7) and re-calibrates the accelerometer data (3), and further generates a calibrated accelerometer data (9). The processing unit (8) recalibrate the accelerometer data (3) to align its 3 axes with the 3 axes of the orientation of vehicle so that the calibrated accelerometer data (9) is useful for determining the inappropriate driving behavior events.

The driving behavior events which are considered for analysis and determination may include over-speeding, hard acceleration, sudden braking, fast cornering, quick lane change, fatigue driving, crash detection and distracted driving etc. These events are required to be captured and analyzed as part of driver behavior monitoring.

These data (3, 5, 7) may be received from the sensors (2, 4, 6) inside a mobile communication device being carried by the driver or from the sensors (2, 4, 6) inside a separate IMU placed in the vehicle, as well as some combination of both. The mobile communication device may have the 3-axis accelerometer (2), direction sensor (4) and the orientation sensor (6). The direction sensor (4) can be a GPS/GNSS sensor that can be used to obtain direction and speed data. The orientation sensor can be Gyroscope sensor that generates angular velocity data. The IMU unit may have the 3-axis accelerometer (2) and the orientation sensor (6) to provide accelerometer and orientation data respectively. The IMU unit can be battery powered. The IMU unit may use Bluetooth low energy connectivity to send the sensor data to the driver's mobile communication device, which can also be his/her smartphone.

It is to be noted that the mobile communication device is generally picked up by the driver multiple times during commutation, which leads to change in orientation of smartphone. This means that the system (1) of calibration of accelerometer data takes into account such changes in orientation so that its 3 axes are aligned correctly with the orientation of vehicle after each such change in orientation of smartphone. In case, if the data (3, 5, 7) is received from the fixed IMU unit in the vehicle, it requires calibration only once during initial placement, or maximum when it is displaced for any repairs. Hence, the embodiment where IMU unit's data is used, the computational requirements of the system (1) reduce while computing driver behavior. Also, such an embodiment ensures that the data is captured from a designated vehicle in which the IMU is placed, thus improving accuracy in the determination of driver's behavior.

Further, whenever a driver starts driving the vehicle, the processing unit (8) may automatically start receiving the data from the sensors (2, 4, 6) for further determination of the driving behavior. An advantage of using IMU unit is that even if the GPS/GNSS sensor of the Smartphone is switched off (to conserve battery of the Smartphone), the sensor data received from the IMU unit enables the system (1) to identify certain key driving behavior events (Alerts) such as Hard-Acceleration, Sudden Braking, Fast Cornering and Quick Lane Change.

After calibrating the accelerometer data (3), the processing unit (8) compares the corrected accelerometer data (9) in a XY plane of the vehicle at each time instance with a fifth predefined threshold (not shown in the figure). If a magnitude of the corrected accelerometer data (9) is above the fifth predefined threshold, the processing unit (8) determines such time instance as an inappropriate driving behaviour instance (30).

Figures 1, 2:
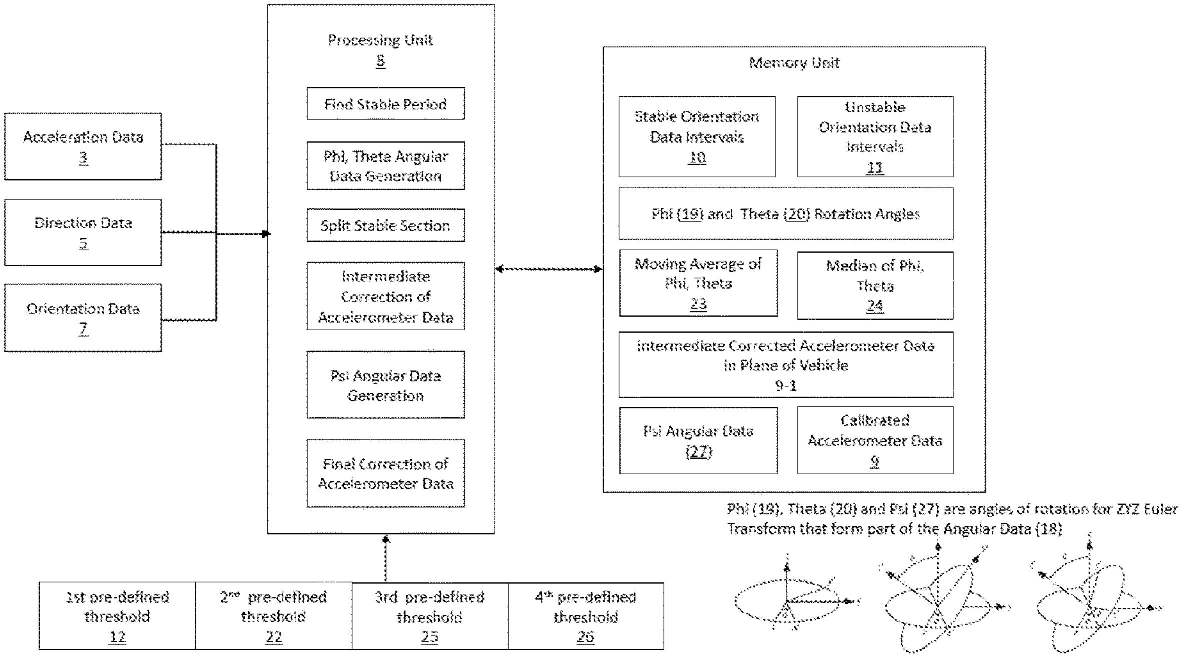
Figure 2:
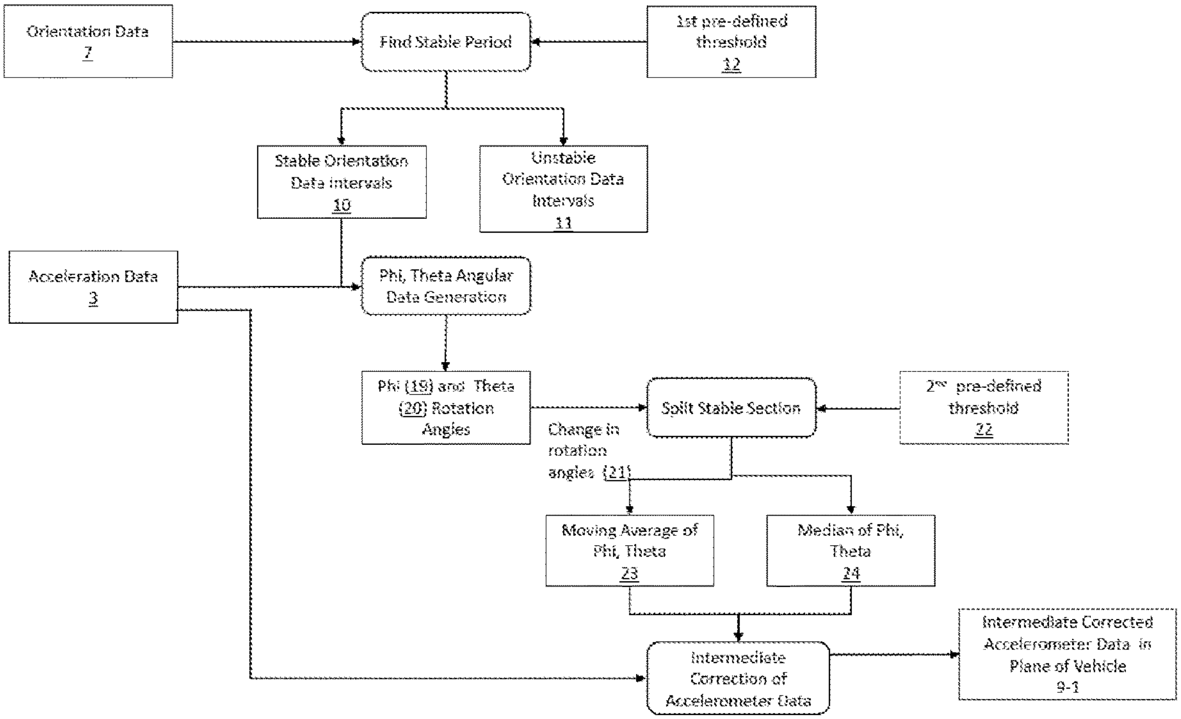
Figure 2:
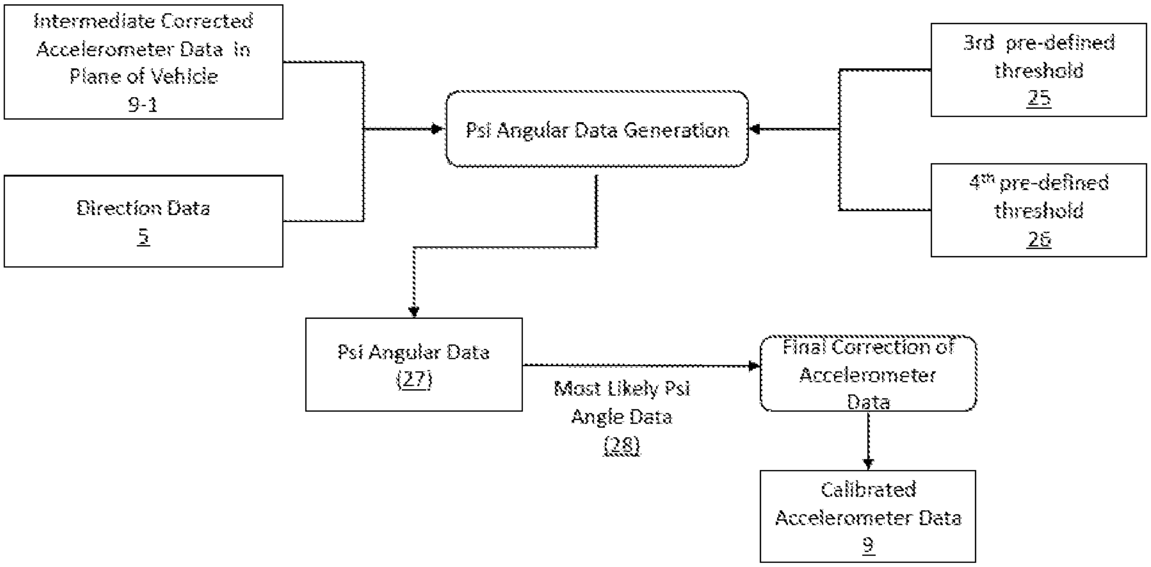

Discussing FIG. 2-1 and FIG. 2-2 together to elaborate on generating calibrated acceleration data (9). FIG. 2-1 illustrates another embodiment of a part of the system (1) which relates to generating calibrated acceleration data (9). While, FIG. 2-2 illustrates the sequence of process steps carried out inside the processing unit (8) related to generation of calibrated acceleration data (9).

In this embodiment, the processing unit (8) uses the acceleration data (3), direction data (5) and the orientation data (7) to generate angular data relating to the three angles of rotation (namely, phi, theta and psi corresponding to Euler Z-Y-Z transformation) for each time instant by which Z, Y and Z axes of accelerometer needs to be rotated in sequence to align the accelerometer with the three axes of the orientation of the vehicle at each instant and generate the calibrated accelerometer data (9).

For still better performance of the calibration of the accelerometer data (3), only the orientation data (7) which represents the data from the sequential instances where the difference in the orientation data (7) within a first predefined threshold (12) is considered for calibration. For this, the processing unit (8) receives the orientation data (7) for a predefined period time, and thereafter matches a difference of sequential orientation data (7) for various instances in the predefined time period with the first predefined threshold (12). Where for sequential instances or sequential stretch of instances, the difference in orientation data (7) is within the first predefined threshold (12), those sections of instances are labelled as stable orientation data (10). And, where the difference of the orientation data (7) for sequential instances is outside the first predefined threshold (12), they are labelled as unstable orientation data (11). The processing unit (8) uses the stable orientation data (10) along with the accelerometer data (3) to re-calibrate the accelerometer data (3) and to generate the calibrated accelerometer data (9).

For still better performance of the calibration of the accelerometer data (3), the processing unit (8) processes the stable orientation data (10) in the following way. The processing unit (8) processes the stable orientation data (10) and generates an angular data (18). The angular data (18) includes a phi-pre angle of orientation (19) of the 3-axis accelerometer (2) with respect to a frame of reference of the vehicle, which is representative of first rotation angle around Z-axis of the frame of reference, and a theta angle of orientation (20) of the 3-axis accelerometer (2) with respect to the frame of reference of the vehicle, which is representative of tilt around a Y-axis of the frame of reference. The processing unit (8) compares a change in angular data (21) with a second predefined threshold (22). If the change in angular data (21) is within the second predefined threshold (22), then the processing unit (8) splits the angular data (18) into smaller sub-sections periods and calculates a moving average of the angular data (23). If the change in angular data (21) is within the second predefined threshold (22), then the processing unit (8) generates a median value of the angular data (24). The processing unit (8) processes the moving average of the angular data (23) or the median value of the angular data (24) along with the accelerometer data (2) and re-calibrates the accelerometer data (2) and generates the intermediate calibrated accelerometer data in the plane of the vehicle (9-1).

For still better performance of the calibration of the accelerometer data (3), the processing unit (8) compares the intermediate calibrated accelerometer data in the plane of the vehicle (9-1) with a third predefined threshold (25), and simultaneously compares the direction data (5) for corresponding period with a fourth predefined threshold (26). If the corrected accelerometer (9) is above the third predefined threshold (25) and the direction data (5) is below the fourth predefined threshold (26), the processing unit (8) determines a psi angle of orientation (27) of the 3-axis accelerometer (2) with respect to the frame of reference of the vehicle for the stable period. The psi angle of orientation (27) of the 3-axis accelerometer (2) is representative of second rotation around Z-axis of the frame of reference. The processing unit (8) further determines the most frequent or most likelihood psi angle (28). Thereafter, the processing unit processes the angular data (18) along with the most likelihood psi angle (28) and the accelerometer data (3) and re-calibrates the accelerometer data (3) and generates the final calibrated accelerometer data (9). In one embodiment of the present invention, the psi value may be selected from multiple psi values using a Kernel Density Estimation method for probability density distribution and then finding the maximum likelihood psi.

In case, where the accelerometer data (2) is captured from smartphone of driver, the orientation of smartphone in the vehicle can undergo a change anytime the smartphone is picked up or moved by the driver during the drive. This implies that the accelerometer data (2) needs to be re-calibrated so that its 3 axes are aligned with the orientation of vehicle. GPS/GNSS sensor and Gyroscope sensor in Smartphone provide the direction data (5) and orientation data (7) respectively. The above methodology mentioned is applied to such situation as elaborated herein below:

1. Objective of Smartphone orientation correction is to convert the 3D frame of reference of smartphone to frame of reference of vehicle. In other words, the acceleration data recorded by accelerometer in 3 dimensions (x, y, z) is transformed to the corresponding acceleration data in the direction of vehicle (X, Y, Z). Thereafter this corrected acceleration data can be used for remaining steps of sensor data processing. The following steps describes transforming of the acceleration data from smartphone frame of reference to vehicle frame of reference.
2. Z-Y-Z Euler angle transformation is used to describe the 3 angles needed to change the orientation. The three angles are phi (first rotation around Z), theta (tilt around Y) and psi (second rotation around Z).
3. The entire sensor data is backed up of a trip into periods where the gyroscope is relatively stable. Wherever gyroscope data is relatively unstable indicates a phone movement due to some user activity.
4. For the stable period, using smoothened accelerometer readings, the phi (first rotation around Z) and theta (tilt around Y) angles at each time instant are computed, using certain Euler angle based trigonometric equations.
5. If within a stable period, we find that the theta and phi angles are changing above a certain threshold, it indicates that the phone position is changing due to some natural drift or slippage in a moving vehicle. In such a case, the processing unit further split the stable period into smaller sub-sections periods and calculate the moving average of phi and theta.
6. If within a stable period, the processing unit finds that the theta and phi angles are not changing above a certain threshold, then the processing unit calculates a single theta and phi angle for the entire stable using median values of acceleration.
7. Now for each stable period or sub-section, the processing unit finds the accelerometer readings corrected using the phi and theta angles by applying certain Euler angle based trigonometric equations. The processing unit finds the corrected accelerometer readings whose magnitude of acceleration in the XY plane of the vehicle (x2 plus y2) that are above a certain threshold and the GPS heading change around that time is below a certain threshold. These are events of interest where potentially a Sudden braking or Hard acceleration occurred.
8. For each such event, the processing unit calculates psi angle using the corresponding phi and theta values and the accelerometer data at that time and applying them on certain Euler angle based trigonometric equations. For each stable period or sub-section, the processing unit generates multiple psi values and the one which has the highest frequency or likelihood is selected and matched in direction with the change in GPS speed at that event. The above steps 7 and 8 ensure that psi angle determination performs well even if certain GPS data is noisy or inaccurate as it calculates the angle based on majority view from different events (both acceleration and deacceleration) collected for each stable period or sub-section. This improves the robustness of the Smartphone orientation correction compared to existing techniques.

9. At the end of this process, the processing unit generates the three angles: phi, theta and psi for each stable period or sub-section. These are the three angles used to transform the orientation of accelerometer readings from Smartphone frame of reference to Vehicle frame of reference.
10. In any stretch of the drive, if the processing unit is not able to determine the three transformation angles conclusively, the GPS sensor data is solely used for determining the driving behavior parameters for that stretch of the drive. This further improves the robustness of the system.

Figures 1, 3:
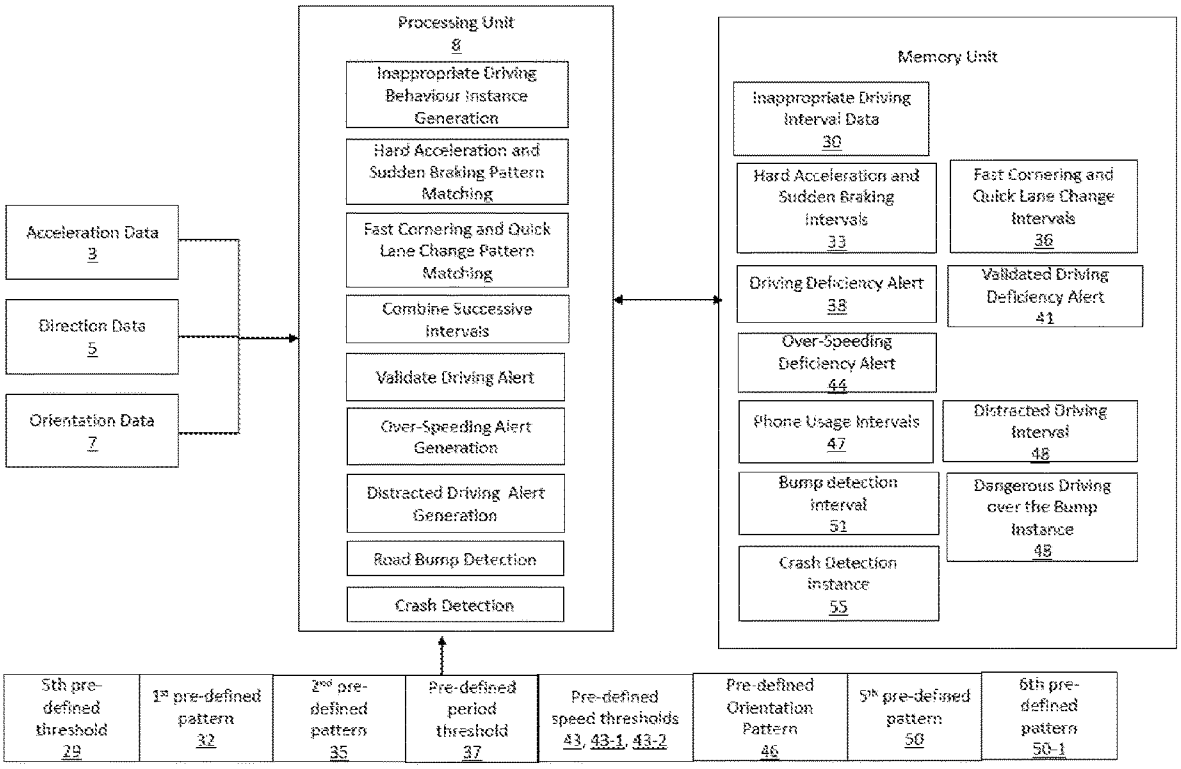
Figures 2, 3:
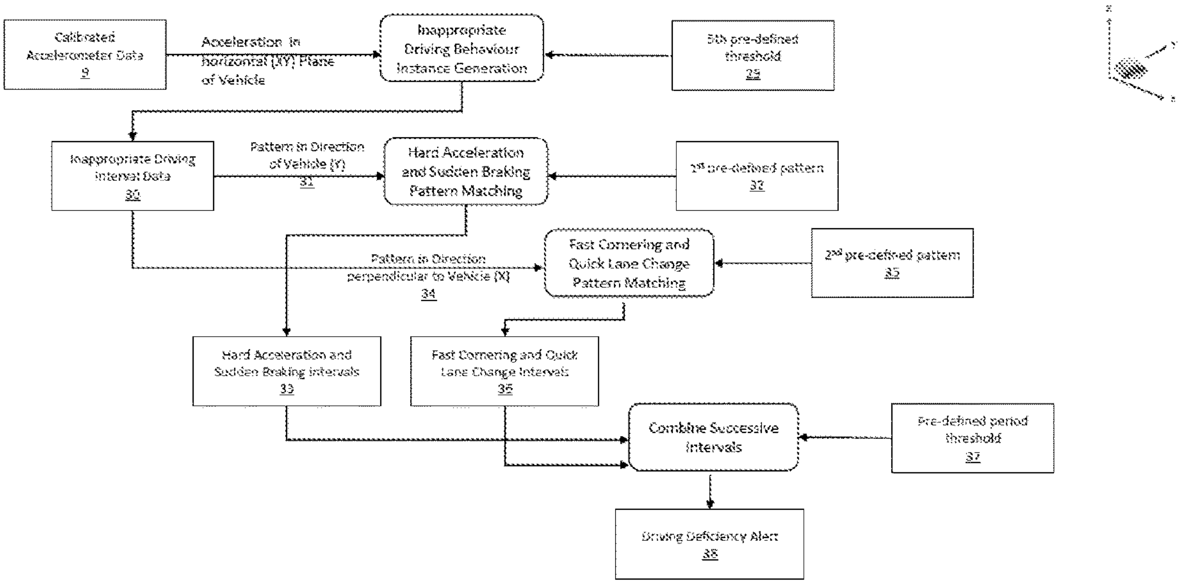
Figures 2, 3:
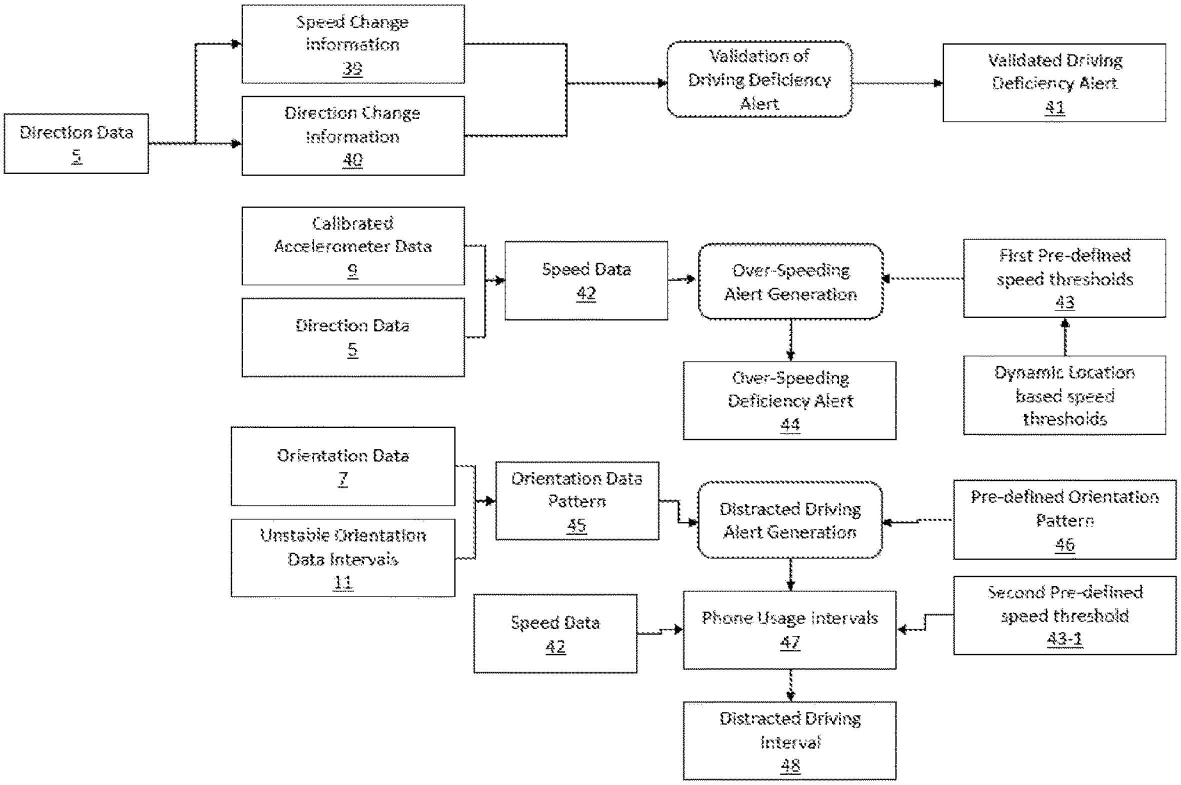
Figure 3:
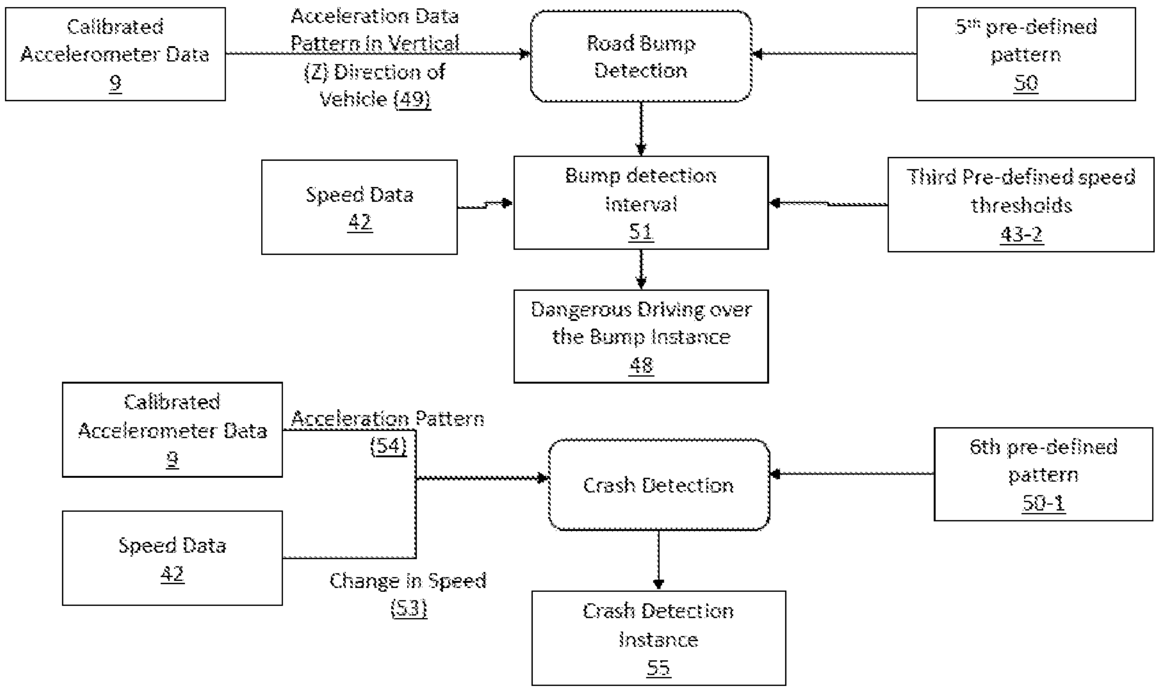

In case of fixed IMU unit, the accelerometer data from the IMU unit needs to be corrected so that its 3 axes are aligned with the direction of vehicle. However, this correction needs to be performed only once and is simpler as compared to Smartphone sensor data correction method. The following are the steps for this one-time correction:

1. The objective is to transform the acceleration data recorded by accelerometer in the IMU sensor in 3 dimensions (x, y, z) to the corresponding acceleration data in the direction of vehicle (X, Y, Z).
2. The processing unit uses Z-Y-Z Euler angle transformation to describe the 3 angles needed to change the orientation. The three angles are phi (first rotation around Z), theta (tilt around Y) and psi (second rotation around Z).
3. The sensor data from one trip of the vehicle that is fitted with the IMU unit is collected. The processing unit computes the phi (first rotation around Z) and theta (tilt around Y) angles at each time instant, using certain Euler angle based trigonometric equations. The processing unit takes the median of the phi and theta angles as the fixed phi and theta angle to be used for transformation.
4. The processing unit determines the corrected accelerometer data using the phi and theta angle computed in Step 3 above by applying certain Euler angle based trigonometric equations. The processing unit finds the corrected accelerometer data that are above a certain threshold and the GPS heading change around that time is below a certain threshold. These are the events of interest where potentially a Sudden braking or Hard acceleration occurred.
5. For each such event, the processing unit calculates psi-post angle using the corresponding phi-pre and theta values and the accelerometer values at that time and applying them on certain Euler angle based trigonometric equations. For each stable period or sub-section, the processing unit determines multiple psi-post values and the one which has the highest frequency or likelihood is selected and matched in direction with the change in GPS speed at that event.
6. At the end of this process, the processing unit generates the three angles: phi, theta and psi based on the accelerometer data collected from one trip.
7. Since the IMU unit is fixed, these are the fixed angles that the processing unit uses for correcting accelerometer data of any future trip without having to recalculate the phi (first rotation around Z), theta (tilt around Y) and psi (post rotation around Z).
8. This saves computation resource requirement of the system. Also, in case of fixed IMU unit, even if the GPS sensor of the Smartphone of the User is switched off (to conserve battery) in subsequent trips, the system is still able to generate Driving Alerts including Hard Acceleration, Sudden Braking, Fast Cornering and Quick Lane Change Discussing FIG. 3-1 and FIG. 3-2 together to elaborate on determining various inappropriate driving behavior instances. FIG. 3-1 illustrates a part of the system (1) determining various inappropriate driving behavior instances, namely hard acceleration or deacceleration interval (33), fast cornering or fast lane change interval (36), over speeding instance (44), distracted driving time interval (48), dangerous driving over bump instance (52), and crash detection instance (55). While, FIG. 3-2 illustrates the sequence of process steps in the system determining various inappropriate driving behavior instances, as described below.

The processing unit (8) compares the corrected accelerometer data (9) in the horizontal (XY) plane of the vehicle at each time instance with a fifth predefined threshold (29), and if a magnitude of the corrected accelerometer data (9) is above the fifth predefined threshold (29), the processing unit (8) is adapted to determine such time instance as an inappropriate driving behaviour instance (30).

The processing unit (8) determines a first pattern (31) in the corrected accelerometer data (9) in direction of vehicle movement for successive time intervals for various inappropriate driving behaviour instances (30). If the first pattern (31) matches a first predefined pattern (32), to determine the time interval as hard acceleration or deacceleration interval (33). This helps in determining sudden braking and hard acceleration events.

The processing unit (8) determines a second pattern (34) in the corrected accelerometer data (9) perpendicular to direction of vehicle movement for successive time intervals for various inappropriate driving behaviour instances (30). If the second pattern (34) is beyond a second predefined pattern (35), to determine the time interval as fast cornering or quick lane changing interval (36). This helps in determining the Fast Cornering and Quick Lane Change type of Events The pattern matching technique used can be based on Dynamic Time Warp (DTW) based pattern matching techniques to classify each time instant of corrected Accelerometer data into relevant categories. This technique uses a sliding window to match the corrected Accelerometer pattern with the reference DTW pattern. Sliding window is a set of corrected accelerometer readings around a center point. For each point, the sliding window is shifted by certain number of points and DTW pattern matched. Consecutive sliding windows that match a DTW pattern pertaining to a Driving Alert are combined so as to label one instant of continuous Driving Alert as a single instance. This enables high accuracy of identifying the Driving Alert and at the same time avoiding any double counting of Driving Alerts.

It is to be noted that for determining hard acceleration or deacceleration interval (33) and fast cornering or quick lane change interval (36), the processing unit (8) does not use location data from GPS/GNSS sensor. Therefore, in the embodiment of where the fixed IMU unit's sensors are used and the accelerometer data (2) correction is required only once (not needed for each trip), the processing un it (8) can generate Driving Alerts even if the GPS/GNSS sensor of the mobile communication device is switched off for battery saving purpose.

For sections of the drive, for which accelerometer data (2) is not available or corrected accelerometer data (9) cannot be determined, GPS sensor data can used for determining the hard acceleration or deacceleration intervals (33), and the fast cornering or quick lane changing intervals (36). Vehicle Speed is calculated from GPS sensor data by differentiating the distance between two consecutive GPS readings by the time difference between the two consecutive readings. This Vehicle Speed at each instant is used to further calculate the Acceleration and Deacceleration of the moving vehicle.

For Fast Cornering detection or Quick Lane change intervals (36), the direction data (5) of GPS is used to calculate an angular velocity and speed data obtained from GPS is used to define the tangential velocity. These two are multiplied to calculate the centripetal acceleration which is the indicative of the cornering force applied. If the cornering force is greater than a certain threshold, it's considered as Fast Cornering or Quick Lane changing.

The processing unit (8) processes the hard acceleration or deacceleration intervals (33), and the fast cornering or quick lane change intervals (36), and if intervals (33, 36) of same type are lying within a predefined period (37), the processing unit (8) combines the intervals of the same type and generates a driving deficiency alert (38) of that type for the combined interval.

Further, the processing unit (8) receives a speed change information (39) and a direction change information (40) for various inappropriate driving behaviour instances (30), and correlates the driving deficiency alert (38) with the speed change information (39) and a direction change information (40), and determines a correctness and severity (41) of the driving deficiency alert (38). In one embodiment, the processing unit (8) may use either of the speed change information (39) and the direction change information (40) for determining the correctness and severity (41) of the driving deficiency alert (38).

The processing unit (8) processes the corrected accelerometer data (9) and the direction data (5) for various inappropriate driving behaviour instances (30) and determines a speed of the vehicle (42) during those instances. In one embodiment, the processing unit (8) uses filter such as Kalman or Complementary filter to determine to determine speed of the vehicle (42). The processing unit (8) compares the speed of the vehicle (42) with a first predefined threshold speed (43), and if the speed of the vehicle (42) is above first predefined threshold speed (43), the processing unit (8) determines the instance as over speeding instance (44). In one embodiment, the first predefined threshold speed (43) is dynamically established based on the location of the vehicle provided by GPS sensor and location-based road speed limit information available from external sources.

The processing unit (8) processes the orientation data (7) for unstable orientation data periods (11) and determines a orientation data pattern (45). Further, the processing unit (8) compares the orientation data pattern (45) with a predefined orientation pattern (46), and if a match occurs, it determines the time interval as a phone usage time interval (47). Thereafter, the processing unit (8) correlates the phone usage time interval (47) with a second pre-defined speed threshold (43-1) and determines the phone usage time interval as drive distraction time interval (48).

For bump detection, the processing unit (8) processes the corrected accelerometer data (9) in the direction of ground for small sub-sections of stable orientation data periods (10), and determines a data pattern (49) in the corrected accelerometer data in the direction of ground. Further, the processing unit (8) compares the data pattern (49) with a fifth predefined data pattern (50), and if a match occurs, it determines the interval as a bump detection interval (51). Thereafter, the processing unit (8) correlates the bump detection interval (51) with a third pre-defined speed threshold (43-2) and determines the bump detection interval as dangerous driving over the bump instance (52).

For determining a crash detection instance (55), the processing unit (8) processes the speed (42) of the vehicle at for small intervals and determines an abrupt drop in speed (53). The processing unit (8) further processes the corrected accelerometer data (9) around same time intervals to determine an acceleration pattern (54). Thereafter, the processing unit (8) correlates the abrupt change in speed (53) with the acceleration pattern (54) and matches the acceleration pattern (54) with a sixth pre-defined pattern set (61) to determine the crash detection instance (55). In one embodiment, the processing unit (8) may specifically match the acceleration pattern in the horizontal (XY) plane of the vehicle with a sixth pre-defined pattern set (61) to determine the direction with respect to the vehicle from which the crash occurred.

In one embodiment, this crash detection instance (55) can be transmitted in real time to a Cloud Server using wireless connectivity provided by the mobile communication device of the user. Also, processed data around the time of the Crash Alert such as the approaching speed, direction, location and driving behavior is sent to the Cloud Server. Depending upon the use, this information in the Cloud Server is used to notify Emergency response service, to provide roadside assistance. It may also be used for accident reconstruction and auto insurance claims management.

It is to be noted that the processing unit (8) is further enabled to process all the inappropriate driving behaviour instances to generate a composite score or a ranking to rate driver's driving skills.

Figure 4:
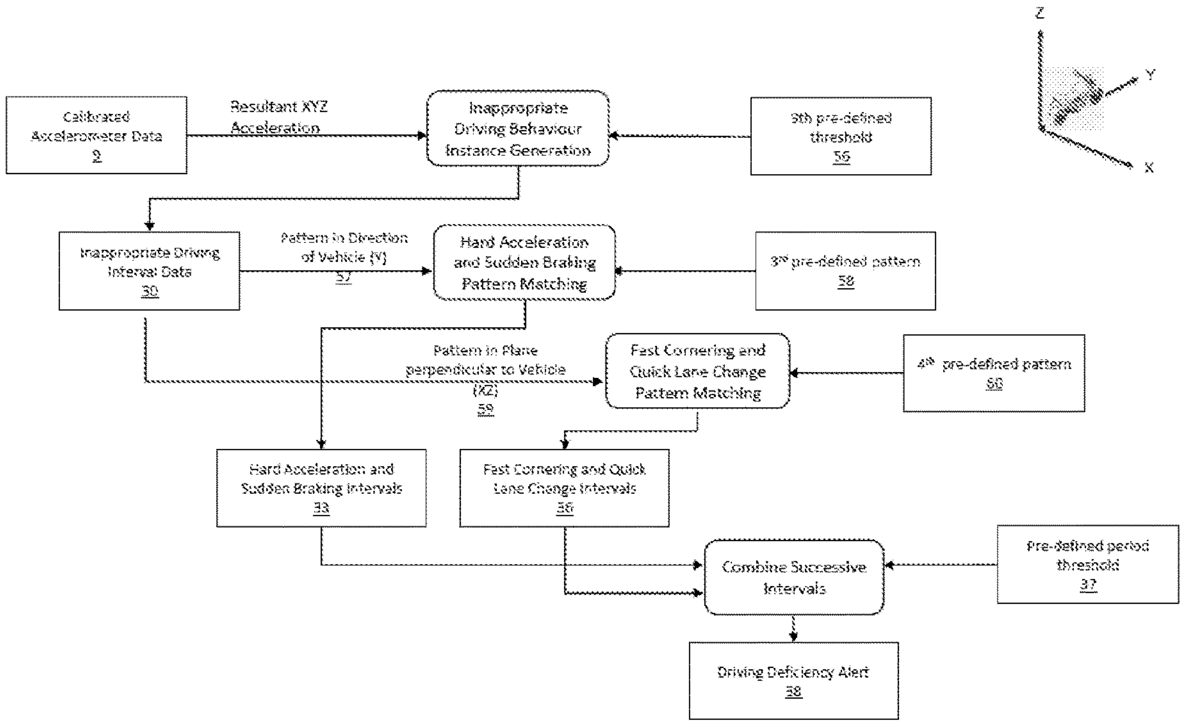
FIG. 4 illustrates a part of the system determining various inappropriate driving behaviour instances for vehicles that rotate laterally

FIG. 4 illustrates a part of the system (1) determining various inappropriate driving behaviour instances for vehicles that rotate laterally, such as bikes, scooters. To keep the brevity in the disclosure, only those elements are being described which have differential processing with respect to FIG. 3's system. The difference in processing lies in determining some of the inappropriate driving behaviour instance (30), specifically hard acceleration or deacceleration interval (33) and fast cornering interval (36), which are described below.

The processing unit (8) compares the corrected accelerometer data (9) in a three-dimensional frame of the vehicle at each time instance with a ninth predefined threshold (56). If the magnitude of the corrected accelerometer data (9) is above the ninth predefined threshold (56), the processing unit (8) determines such time instance as an inappropriate driving behaviour instance (30).

The processing unit (8) determines a third pattern (57) in the corrected accelerometer data (9) in direction of vehicle movement for successive time intervals. If the third pattern (57) matches a third predefined pattern (58), the processing unit (8) determines the time interval as hard acceleration or deacceleration interval (33). Further, the processing unit (8) determines a fourth pattern (59) in the corrected accelerometer data (9) in the plane perpendicular to direction of vehicle movement for successive time intervals. If the fourth pattern (59) is beyond a fourth predefined pattern (60), the processing unit (8) determine the time interval as fast cornering interval (36). The pattern matching technique used can be based on Dynamic Time Warp based pattern matching techniques to classify each time instant of corrected Accelerometer data into relevant categories.

Figure 5:
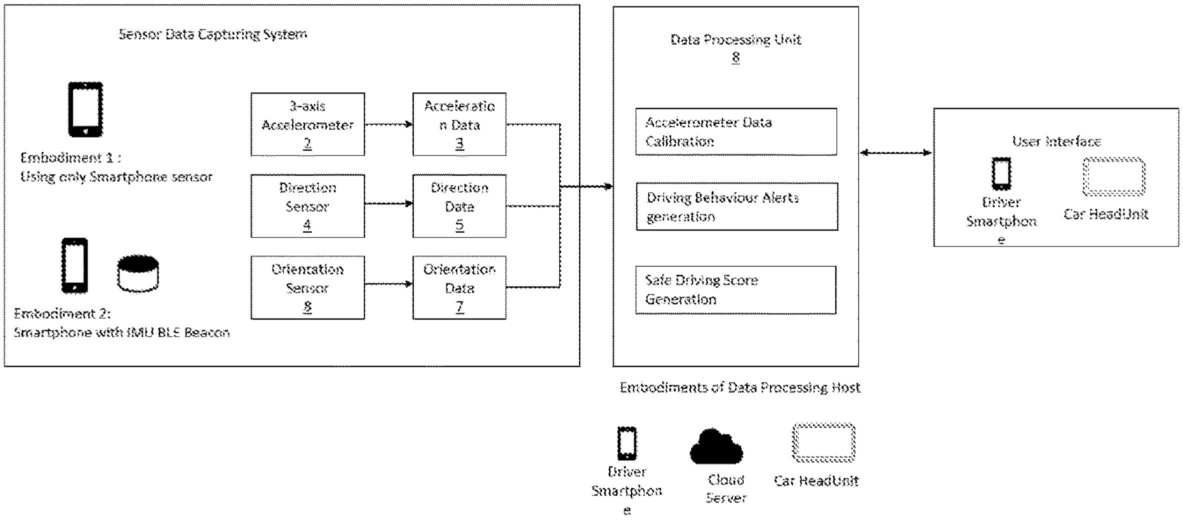
FIG. 5 shows a schematic diagram of another embodiment of the system for driving behavior monitoring and feedback including data capturing, data calibration, inappropriate driving behavior alerts and safe driving generation, and User interface for drivers.

FIG. 5 shows a schematic diagram of embodiment of the system for driving behavior monitoring and feedback including data capturing, data calibration, inappropriate driving behavior alerts and safe driving generation, and User interface for drivers.

The system allows flexibility to add newer safe driving factors to be considered. Also, the safe driving factors calculation are vectorized (parallelized) over a large number of raw sensor data points in order to improve the performance of safe driving factor computation. Varying thresholds are applied depending upon the factor being considered. The thresholds depend upon the type of vehicle and the geographic location where the vehicle is driven. In general, additional criteria can be added to modify the thresholds considered for each type of factor.

Further the processing unit can be configured to assign a score for each individual factor and calculating a composite safe driving score. For each of the factors affecting safety (such as Over-speeding, Hard acceleration, Sudden Braking, Fast Cornering, Distracted Driving, Dangerous Driving over bumps) a score can be assigned out of 100. The logic for computing the score related to each factor varies based on the factor. Generally, a score of 100 can be assigned for a factor for a given driver/vehicle in case there is no abnormal or rash driving event found in the Drive with respect to that variable. In case rash driving event is found in the Drive with respect to a variable, the number, duration and severity of each event is rated and combined to assign an overall percentage rating for that drive on that parameter.

Scores of individual factors are combined to generate an overall safe driving score of a drive or a trip. Scores across trips can be combined by the processing unit by using weighted average of distance travelled in each drive to give an overall safe driving score. The trend of safe driving score across trips and time is used to improve driving skills and encourage safe driving behavior from the driver.

In some embodiments, techniques for normalizing the safe driving scores for different driving conditions can be used. Different driving conditions are referred to be such as highway vs non-highway, weight of vehicle, driving during day or night time, prevalent weather condition during the drive based on the location of the drive. These normalizations enable safe driving score to reflect the risk more accurately. For example, Over-speeding under rainy weather condition or night time is riskier than Over-speeding under fair weather and day time. These normalizations can be compared across drivers in order to rate and rank drivers in a group for the purpose of their safe driving ability, gamification and training.

The system 1 can utilize sensor data received from the Driver's Smartphone itself where the sensor data is already aggregated. This reduces the cost and time of transferring the voluminous data to another computing resource. This also addresses the privacy concern of users by avoiding sending any private information such as GPS location to the server. At the same time, system can use the GPS location information locally to generate the Driving Score which can be sent to the server. User can still see the Analyzed Driving Behavior Events including each trip details and route inside a user interface of an application running on the Smartphone of the driver. In another embodiment, the captured sensor data is transferred in real time to the Vehicle's Head Unit using connectivity technologies such as Bluetooth or Wifi and the sensor data is processed in the processing resources of the Vehicle's Head Unit. In yet another embodiment of the Invention, the captured sensor data is transferred in real time or on batch basis to a Cloud based server using connectivity technologies such as Cellular/Wifi and the sensor data processing is executed on the processing resources of the Cloud based Server. In another embodiment of the Invention, the sensor data processing can switch between execution on Driver's Smartphone and Cloud based execution depending upon the availability of resources and connectivity between Smartphone and Cloud.

Analyzed Driving Behavior Events and Safe Driving Scoring trends from the Drivers trips are displayed to the Driver using a smartphone based mobile application running on their smartphone. The Application enables Driver to view his/her Driving behavior for each trip as well as aggregated score across trips. Driver can analyze which component of his/her driving needs improvement by drilling down to the detailed alert view of each trip. Also, the composite Driving score is used to compare and indicate ranking of a Driver within a Group. Similar User Interface can be provided using other applications such as Web Based Dashboard Application. The analyzed data can be sent to a cloud server and further shared with third parties such as Insurance and Automotive companies with Driver's consent.

Irrespective of capturing data from either mobile communication device (smartphone) or the IMU unit, the steps related to Driving Behavior (Alerts) Generation and Safe Driving Score Generation remains common. This increases flexibility of the system and reducing the memory footprint of the overall system to enable it being deployed on memory constrained mobile devices.

In another embodiment, the sensor data is processed during an ongoing drive and audio or visual alerts are generated on Driver's Smartphone during the ongoing drive to warn the driver when driving behavior is unsafe.

It is to be noted that for personal owned vehicles, the system can be used for giving guidance to vehicle owner or driver to drive in a safe manner. For fleet vehicles that are owned by an organization, the system can be used as part of fleet Management System to ensure safe driving practices and reduce accident risk. For Motor Insurance companies, the system can be used to rate the accident risk of each driver or vehicle that is insured by the Insurance company. The System can be used to create underwriting models as part of Usage Based Insurance policies wherein the premium of the policy is varied based on the Driving behavior of the Driver or Drivers driving a certain vehicle. Vehicle Manufacturers can use this system to understand how drivers drive the vehicles in the field under various driving conditions and hence design vehicles with adequate safety measures, controls, and warning systems. Invention is also useful for various other players in the automotive ecosystem who are interested in monitoring driving behavior and providing solutions based on driving behavior.

LIST OF REFERENCE SIGNS

1 System
2 3-axis accelerometer
3 Accelerometer data
4 Direction sensor
5 Direction data
6 Orientation sensor
7 Orientation data
8 Processing unit
9 Calibrated accelerometer data
9-1 Intermediate Corrected acceleromter data
10 Stable orientation data

11 Unstable orientation data
12 First predefined threshold
18 Angular data
19 phi angle of orientation
20 theta angle of orientation
21 change in angular data
22 second predefined threshold
23 moving average of the angular data
24 median value of the angular data
25 third predefined threshold
26 fourth predefined threshold
27 psi angle of orientation
28 most frequent or most likely psi angle
29 fifth predefined threshold
30 inappropriate driving behaviour instance
31 first pattern in the corrected accelerometer data
32 first predefined pattern
33 hard acceleration or deacceleration interval
34 second pattern in the corrected accelerometer data
35 second predefined pattern
36 fast cornering and quick lane change interval
37 predefined period
38 driving deficiency alert
39 speed change information
40 direction change information
41 correctness and severity of the driving deficiency alert
42 speed of the vehicle
43 first predefined speed threshold
43-1 second predefined speed threshold
43-2 third predefined speed threshold
44 over speeding instance
45 orientation data pattern
46 predefined orientation pattern
47 phone usage time interval
48 drive distraction time interval
49 acceleration data pattern in direction of vehicle
50 fifth predefined data pattern
50-1 sixth predefined data pattern
51 bump detection interval
52 dangerous driving over the bump interval
53 abrupt change in speed
54 acceleration pattern
55 crash detection instance
56 ninth predefined threshold
57 third pattern in the corrected accelerometer data in direction of vehicle
58 third predefined pattern
59 fourth pattern in the corrected accelerometer data in plane perpendicular to vehicle
60 fourth predefined pattern

I claim:

1. A system (1) to efficiently determine a driving behaviour of a driver driving a vehicle, the system comprising:
- a 3-axis accelerometer (2) placed inside the vehicle, the 3-axis accelerometer (2) is adapted to generate an accelerometer data (3) related to an acceleration of the vehicle at each time instant;
- a direction sensor (4) placed inside the vehicle, and adapted to generate a direction data (5) related to a direction in which the 3-axis accelerometer (2) is travelling;
- an orientation sensor (6) placed inside the vehicle, and adapted to generate an orientation data (7) related to an orientation and an angular velocity of the 3-axis accelerometer (2); and
- a processing unit (8) adapted to process the accelerometer data (3), the direction data (5) and the orientation data (7), and to re-calibrate the accelerometer data (3) to generate a calibrated accelerometer data (9) where the 3 axes of accelerometer are aligned with 3 axes of the orientation of the vehicle,
- wherein the calibrated accelerometer data (9) corresponds to the spatial reference frame of the vehicle, used in determining the driving behavior of the driver of the vehicle.

2. The system (1) as claimed in claim 1, wherein the processing unit (8) is adapted to process the direction data (5) to determine deviation in the direction data (5), and based on such determination, adapted to process the accelerometer data (3) and the orientation data (7) to re-calibrate the accelerometer data (3) and to generate the calibrated accelerometer data (9).

3. The system (1) as claimed in claim 2, wherein the processing unit (8) is adapted to receive the orientation data (7) for a predefined period of time, to match orientation data (7) for various instances in the predefined time period, and to divide the orientation data (7) in two Sections:
- a stable orientation data (10) for one or more sections in the predefined time period when a difference in the orientation data (7) is within a first predefined threshold (12) with respect to sequential instances or sequential stretch of instances, and
- an unstable orientation data (11) for one or more sections in the predefined time period when the difference of the orientation data (7) is outside the first predefined threshold (12) with respect to sequential instances or sequential stretch of instances,
- wherein the processing unit (8) is adapted to process the stable orientation data (11) along with the accelerometer data (3) to re-calibrate the accelerometer data (3) and to generate the calibrated accelerometer data (9).

4. The system (1) as claimed in claim 3, wherein the processing unit (8) is adapted to process the stable orientation data (10) and to generate an angular data (18) comprising:
- a phi angle of orientation (19) of the 3-axis accelerometer (2) with respect to a frame of reference of the vehicle, which is representative of first rotation angle around Z-axis of the frame of reference, and
- a theta angle of orientation (20) of the 3-axis accelerometer (2) with respect to the frame of reference of the vehicle, which is representative of tilt around a Y-axis of the frame of reference,
- wherein the processing unit (8) is adapted to compare a change in angular data (21) with a second predefined threshold (22), and if:
- the change in angular data (21) is within the second predefined threshold (22), then the processing unit (8) is adapted to split the angular data (18) into smaller sub-sections periods and calculate a moving average of the angular data (23), or
- the change in angular data (21) is within the second predefined threshold (22), then the processing unit (8) is adapted to generate a median value of the angular data (24),
- Wherein the processing unit (8) is adapted to process the moving average of the angular data (23) or the median value of the angular data (24) along with the accelerometer data (2) to re-calibrate the accelerometer data (2) and to generate the intermediate corrected accelerometer data in the horizontal (XY) plane of the vehicle (9-1).

5. The system (1) as claimed in claim 4, wherein the processing unit (8) is adapted to compare the intermediate corrected accelerometer data (9-1) with a third predefined threshold (25), and to compare the direction data (5) for corresponding period with a fourth predefined threshold (26), and if the intermediate corrected accelerometer (9-1) is above the third predefined threshold (25) and the direction data (5) is below the fourth predefined threshold (26), the processing unit (8) is adapted to determine a psi angle of orientation (27) of the 3-axis accelerometer (2) with respect to the frame of reference of the vehicle for the stable period, which is representative of second rotation around Z-axis of the frame of reference, the processing unit (8) is adapted to determine most frequent or most likelihood psi angle (28), and to process the angular data (18) along with the determined psi angle (28) and the intermediate corrected accelerometer data (9-1) to re-calibrate the intermediate corrected accelerometer data (9-1) and to generate the final calibrated accelerometer data, where the 3 axes of accelerometer are aligned with the direction of the vehicle (9).

6. The system (1) as claimed in claim 1, wherein the processing unit (8) is adapted to compare the corrected accelerometer data (9) in the horizontal (XY) plane of the vehicle at each time instance with a fifth predefined threshold (29), and if a magnitude of the corrected accelerometer data (9) is above the fifth predefined threshold (29), the processing unit (8) is adapted to determine such time instance as an inappropriate driving behaviour instance (30).

7. The system (1) as claimed in claim 6, wherein the processing unit (8) is adapted to determine a first pattern (31) in the corrected accelerometer data (9) in direction of vehicle movement for successive time intervals for various inappropriate driving behaviour instances (30) and if the first pattern (31) matches a first predefined pattern (32), to determine the time interval as hard acceleration or deacceleration interval (33), and the processing unit (8) is adapted to determine a second pattern (34) in the corrected accelerometer data (9) perpendicular to direction of vehicle movement for successive time intervals for various inappropriate driving behaviour instances (30) and if the second pattern (34) is beyond a second predefined pattern (35), to determine the time interval as fast cornering or quick lane changing interval (36).

8. The system (1) as claimed in claim 7, wherein the processing unit (8) is adapted to process hard acceleration or deacceleration intervals (33), and fast cornering or quick lane changing intervals (36), and if intervals (33, 36) of same type are lying within a predefined period (37), the processing unit (8) is adapted to combine the intervals of same type to generate a driving deficiency alert (38) of that type for the combined interval.

9. The system (1) as claimed in claim 8, wherein the processing unit (8) is adapted to receive either a speed change information (39) or a direction change information (40), or combination thereof for various inappropriate driving behaviour instances (30), and to correlate the driving deficiency alert (38) with the speed change information (39) and/or a direction change information (40) to determine a correctness and severity (41) of the driving deficiency alert (38).

10. The system (1) as claimed in claim 6, the processing unit (8) is adapted to process the corrected accelerometer data (9) and the direction data (5) for various inappropriate driving behaviour instances (30) to determine a speed of the vehicle (42) during those instances, and to compare the speed of the vehicle (42) with a first predefined speed threshold (43), and if the speed of the vehicle (42) is above first predefined threshold speed (43), where the predefined threshold could be dynamically determined based on location of vehicle, the processing unit (8) is adapted to determine the instance as over speeding instance (44).

11. The system (1) as claimed in claim 10, wherein the processing unit (8) is adapted to process an orientation data (7) for unstable orientation data periods (11) to determine a orientation data pattern (45), and compare the data pattern (45) with a predefined orientation pattern (46), and if a match occurs, to determine the time interval as a phone usage time interval (47), and to correlate the phone usage time interval (47) with the speed of the vehicle (42) above a second pre-defined speed threshold (43-1) to determine the phone usage time interval as drive distraction time interval (48).

12. The system (1) as claimed in claim 10, wherein the processing unit (8) is adapted to process the corrected accelerometer data (9) in the direction of ground for small intervals of stable orientation data periods (10) and to determine a data pattern (49) in the corrected accelerometer data and to compare the data pattern (49) with a fifth predefined data pattern (50), and if a match occurs, to determine the interval as a bump detection interval (51), and to correlate the bump detection interval (51) with the speed of the vehicle (42) above a third pre-defined speed threshold (43-2) to determine the bump detection interval as dangerous driving over the bump instance (52).

13. The system (1) as claimed in claim 10, the processing unit (8) is adapted to process the speed (42) of the vehicle for small intervals to determine an abrupt change in speed (53), and to process the corrected accelerometer data (9) around the same time intervals to determine an acceleration pattern (54), and to correlate the abrupt change in speed (53) and the acceleration pattern (54) and match the acceleration pattern (54) with a sixth pre-defined pattern (61) to determine a crash detection instance (55).

14. The system (1) as claimed in claim 1, wherein the vehicles are adapted to rotate laterally, and wherein the processing unit (8) is adapted to compare the corrected accelerometer data (9) in a three-dimensional frame of the vehicle at each time instance with a ninth predefined threshold (56), and if the magnitude of the corrected accelerometer data (9) is above the ninth predefined threshold (56), the processing unit (8) is adapted to determine such time instance as an inappropriate driving behaviour instance (30).

15. The system (1) as claimed in claim 14, wherein the processing unit (8) is adapted to determine a third pattern (57) in the corrected accelerometer data (9) in direction of vehicle movement for successive time intervals and if the third pattern (57) matches a third predefined pattern (58), to determine the time interval as hard acceleration or deacceleration interval (33), and the processing unit (8) is adapted to determine a fourth pattern (59) in the corrected accelerometer data (9) in the plane perpendicular to direction of vehicle movement for successive time intervals and if the fourth pattern (59) is beyond a fourth predefined pattern (60), to determine the time interval as fast cornering or quick lane changing interval (36).

* * * * *